United States Patent
Jain et al.

(10) Patent No.: US 8,145,848 B2
(45) Date of Patent: Mar. 27, 2012

(54) PROCESSOR AND METHOD FOR WRITEBACK BUFFER REUSE

(75) Inventors: Prashant Jain, San Jose, CA (US); Srinivasan R Iyengar, Fremont, CA (US); Jeffrey Thomas Oplinger, San Francisco, CA (US)

(73) Assignee: Oracle America, Inc., Redwood City, CA (US)

( * ) Notice: Subject to any disclaimer, the term of this patent is extended or adjusted under 35 U.S.C. 154(b) by 334 days.

(21) Appl. No.: 12/627,354

(22) Filed: Nov. 30, 2009

(65) Prior Publication Data

US 2011/0131379 A1 Jun. 2, 2011

(51) Int. Cl.
*G06F 12/00* (2006.01)
(52) U.S. Cl. ........ 711/143; 711/118; 711/128; 711/135; 711/150; 711/156
(58) Field of Classification Search .................. None
See application file for complete search history.

(56) References Cited

FOREIGN PATENT DOCUMENTS

WO      WO 9713204 A1 *  4/1997

* cited by examiner

*Primary Examiner* — Shawn X Gu
(74) *Attorney, Agent, or Firm* — Meyertons, Hood, Kivlin, Kowert & Goetzel, P.C.; Anthony M. Petro (57) ABSTRACT

A processor may include a writeback configured to perform a first writeback operation to store corresponding writeback data back to a lower-level memory upon eviction of the writeback data, and a writeback buffer configured to store the writeback data after the writeback data has been evicted from the writeback cache and before the writeback data has been sent to the lower-level memory. After the writeback data has been sent from the writeback buffer to the lower-level memory, and before the lower-level memory has acknowledged completion of the first writeback operation, the writeback cache may perform a second writeback operation to store different writeback data in the writeback buffer in response to eviction of the different writeback data, such that a total size of the writeback data for the concurrently outstanding writeback operations exceeds a total size of writeback data that the writeback buffer is capable of concurrently storing.

20 Claims, 8 Drawing Sheets

FIG. 1

| | | | | | | | | |
|---|---|---|---|---|---|---|---|---|
| Fetch (F) | T0 | T3 | T6 | T2 | T7 | T5 | T1 | T4 |
| Cache (C) | | T0 | T3 | T6 | T2 | T7 | T5 | T1 |
| Pick (P) | | | T0 | T3 | T6 | T2 | T7 | T5 |
| Decode (D) | | | | T0 | T3 | T6 | T2 | T7 |
| Execute (E) | | | | | T0 | T3 | T6 | T2 |
| Memory (M) | | | | | | T0 | T3 | T6 |
| Bypass (B) | | | | | | | T0 | T3 |
| Writeback (W) | | | | | | | | T0 |
| Execution cycle | 0 | 1 | 2 | 3 | 4 | 5 | 6 | 7 |

PROCESSOR AND METHOD FOR WRITEBACK BUFFER REUSE

BACKGROUND

1. Field of the Invention

This invention relates to processors and, more particularly, to implementation of memory systems.

2. Description of the Related Art

To improve execution performance, processors commonly include caches. In particular, processors may include writeback caches, which may be configured to write modified data to a lower level of the memory hierarchy when the modified data is evicted from the cache, rather than when the data is modified.

Because the access latency of lower levels of a memory hierarchy may be longer than the latency of the writeback cache, evicted data may be buffered before it is written to the lower level memory. However, if buffer capacity is reached, operation of the writeback cache may stall until the lower level memory makes progress, which may negatively affect processor performance. Increasing the data storage capacity of the buffer may help to reduce the likelihood and/or duration of stalling. However, the physical design implications of increasing buffer capacity, such as routing, die size, and power consumption considerations, may render this option impractical, especially in multicore processor designs where buffers may be replicated across many processor cores.

SUMMARY

Various embodiments of a processor and method supporting writeback buffer reuse are disclosed. In some embodiments, a processor may include a hardware writeback cache configured to store data retrieved from a lower-level memory and further configured to perform a first writeback operation to store corresponding writeback data back to the lower-level memory upon eviction of the writeback data from the writeback cache. The processor may also include a hardware writeback buffer configured to store the writeback data after the writeback data has been evicted from the writeback cache and before the writeback data has been sent to the lower-level memory. After the writeback data has been sent from the writeback buffer to the lower-level memory, and before the lower-level memory has acknowledged completion of the first writeback operation, the writeback cache may be further configured to perform a second writeback operation to store different writeback data, corresponding to the second writeback operation, in the writeback buffer in response to eviction of the different writeback data from the writeback cache. The second writeback operation may be performed such that a total size of the writeback data for the concurrently outstanding writeback operations exceeds a total size of writeback data that the writeback buffer is capable of concurrently storing.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION OF EMBODIMENTS

Introduction

In the following discussion, embodiments of multithreaded processors that implement multiple processor cores will be considered. First, an overview of an example processor core is described, along with an example pipeline diagram illustrating possible instruction flow through a multithreaded processor core. Embodiments of processors including different numbers of cores as well as other features are then discussed. Techniques for implementing and controlling writeback buffers within a multicore processor are then described. Finally, an example system that might include a multithreaded, multicore processor is discussed.

Overview of Fine-Grained Multithreading Processor Core

Generally speaking, a processor core (or simply, a "core") may refer to a unit of a processor that is capable of executing instructions and processing data independently of other processor cores within the processor, such that multiple cores may execute instructions concurrently. One example of a processor core is shown in FIG. 1 as core 100.

Core 100 may be configured to execute instructions and to process data according to a particular instruction set architecture (ISA). In one embodiment, core 100 may be configured to implement the SPARC® V9 ISA, although in other embodiments it is contemplated that any desired ISA may be employed, such as x86, PowerPC® or MIPS®, for example. Additionally, as described in greater detail below, in some embodiments each instance of core 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, core 100 may be configured to concurrently execute instructions from eight threads. Thus, a processor including four, eight, or sixteen instances of core 100 may be configured to concurrently process 32, 64, or 128 threads, respectively. However, in other embodiments it is contemplated that any suitable number of cores 100 may be included within a processor, and that cores 100 may concurrently process some other number of threads.

Figure 1:
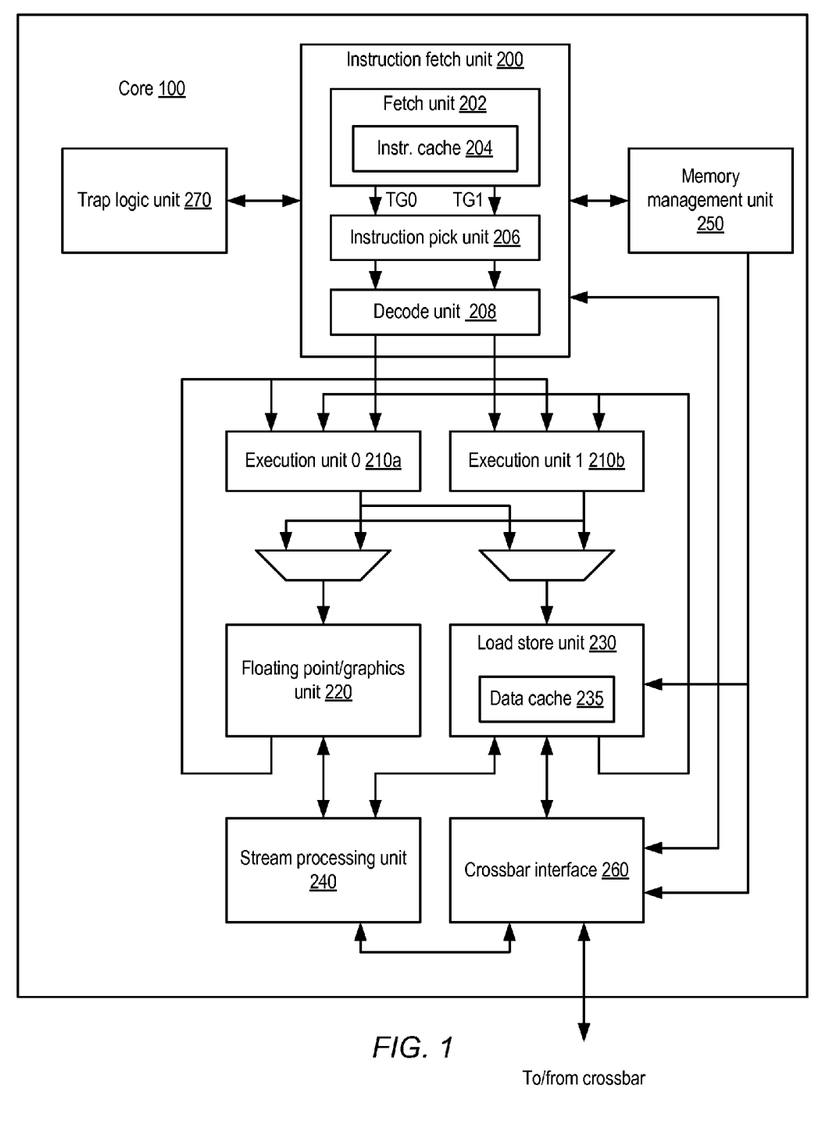
FIG. 1 is a block diagram illustrating an embodiment of a processor core configured to perform fine-grained multithreading.

In some embodiments, such as the one illustrated in FIG. 1, core 100 may be configured to perform fine-grained multithreading. In this type of multithreading, each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle.

In the illustrated embodiment, core 100 includes an instruction fetch unit (IFU) 200 coupled to a memory management unit (MMU) 250, a crossbar interface 260, a trap logic unit (TLU) 270, and a plurality of execution units (EXU0, EXU1) 210*a-b*. (Execution units 210*a-b* may also be referred to generically as EXUs 210.) Each of execution units 210*a-b* is coupled to both a floating point/graphics unit (FGU) 220 and a load store unit (LSU) 230. Each of the latter units is also coupled to send data back to each of execution units 210*a-b*. Both FGU 220 and LSU 230 are coupled to a stream processing unit (SPU) 240. Additionally, LSU 230, SPU 240 and MMU 250 are coupled to crossbar interface 260, which is in turn coupled to crossbar 110 shown in FIG. 1.

Instruction fetch unit 200 may be configured to provide instructions to the rest of core 100 for execution. In the illustrated embodiment, IFU 200 includes a fetch unit 202, an instruction pick unit 206, and a decode unit 208. Fetch unit 202 further includes an instruction cache 204. In one embodiment, fetch unit 202 may include logic to maintain fetch addresses (e.g., derived from program counters) corresponding to each thread being executed by core 100, and to coordinate the retrieval of instructions from instruction cache 204 according to those fetch addresses. In some embodiments, instruction cache 202 may include fewer access ports than the number of threads executable on core 100, in which case fetch unit 202 may implement arbitration logic configured to select one or more threads for instruction fetch during a given execution cycle. For example, fetch unit 202 may implement a least-recently-fetched algorithm to select a thread to fetch. Fetch unit 202 may also implement logic to handle instruction cache misses and translation of virtual instruction fetch addresses to physical addresses (e.g., fetch unit 202 may include an Instruction Translation Lookaside Buffer (ITLB)). Additionally, in some embodiments fetch unit 202 may include logic to predict branch outcomes and/or fetch target addresses, such as a Branch History Table (BHT), Branch Target Buffer (BTB), or other suitable structure, for example.

In one embodiment, fetch unit 202 may be configured to maintain a pool of fetched, ready-for-issue instructions drawn from among each of the threads being executed by core 100. For example, fetch unit 202 may implement a respective instruction buffer corresponding to each thread in which several recently-fetched instructions from the corresponding thread may be stored. In one embodiment, instruction pick unit 206 may be configured to select one or more instructions to be decoded and issued to execution units 210. In the illustrated embodiment, the threads fetched by fetch unit 202 may be divided into two thread groups denoted TG0 and TG1 (for example, if core 100 implements eight threads, each of TG0 and TG1 may include four threads).

Pick unit 206, in the illustrated embodiment, may be configured to attempt to select one instruction to schedule for execution from each of TG0 and TG1, such that two instructions may be selected for execution during a given execution cycle. For example, pick unit 206 may employ a least-recently-picked (LRP) algorithm in which the least recently picked thread within a given thread group that is ready for execution is selected. It is noted that in one embodiment, thread fetching as performed by fetch unit 202 and instruction selection as performed by pick unit 206 may be largely independent of one another. In some embodiments, pick unit 206 may schedule instructions before all factors affecting instruction scheduling are known (e.g., instruction dependencies, implementation-specific resource hazards, etc.), in which case a picked instruction may be canceled at a later execution stage. In other embodiments, it is contemplated that other instruction selection algorithms may be employed, including algorithms that take additional instruction scheduling factors into account. Further, it is contemplated that in some embodiments, pick unit 206 may be configured to select more than two instructions for execution in a given execution cycle, or may select instructions from all threads rather than specific groups of threads. Additionally, in one embodiment pick unit 206 may be configured to identify source operand dependencies that a given picked instruction may have on a previously issued instruction, and may configure other logic to appropriately select source operands (e.g., from a register file, or from a previous execution cycle via bypass logic).

Decode unit 208 may be configured to further prepare instructions selected by pick unit 206 for execution. In the illustrated embodiment, decode unit 208 may be configured to identify the specific type of a given instruction, such as whether the instruction is an integer, floating point, load/store, or other type of instruction, as well as to identify operands required by the given instruction. Additionally, in one embodiment decode unit 208 may be configured to detect and respond to scheduling hazards not detected during operation of pick unit 206. For example, in the illustrated embodiment, only one load store unit 230 is provided. Consequently, if two load/store-type instructions were picked for execution, decode unit 208 may be configured to cancel or stall one of those instructions and allow the other to be issued. In such an embodiment, decode unit 208 may employ an arbitration algorithm to determine which instruction to issue without favoring a particular thread or thread group. Numerous other types of scheduling and resource hazards detectable by decode unit 208 are possible and contemplated.

In some embodiments, instructions from a given thread may be speculatively issued from decode unit 208 for execution. For example, a given instruction from a certain thread may fall in the shadow of a conditional branch instruction from that same thread that was predicted to be taken or not-taken, or a load instruction from that same thread that was predicted to hit in data cache 235, but for which the actual outcome has not yet been determined. In such embodiments, after receiving notice of a misspeculation such as a branch misprediction or a load miss, IFU 200 may be configured to cancel misspeculated instructions from a given thread as well as issued instructions from the given thread that are dependent on or subsequent to the misspeculated instruction, and to redirect instruction fetch appropriately.

Execution units 210*a-b* may be configured to execute and provide results for certain types of instructions issued from IFU 200. In one embodiment, each of EXUs 210 may be similarly or identically configured to execute certain integer-type instructions defined in the implemented ISA, such as arithmetic, logical, and shift instructions. In the illustrated embodiment, EXU0 210a may be configured to execute integer instructions issued from TG0, while EXU1 210b may be configured to execute integer instructions issued from TG1. Further, each of EXUs 210 may include an integer register file configured to store register state information for all threads in its respective thread group. For example, if core 100 implements eight threads 0-7 where threads 0-3 are bound to TG0 and threads 4-7 are bound to TG1, EXU0 210a may store integer register state for each of threads 0-3 while EXU1 210b may store integer register state for each of threads 4-7. It is contemplated that in some embodiments, core 100 may include more or fewer than two EXUs 210, and EXUs 210 may or may not be symmetric in functionality. Also, in some embodiments EXUs 210 may not be bound to specific thread groups or may be differently bound than just described. Finally, in the illustrated embodiment instructions destined for FGU 220 or LSU 230 pass through one of EXUs 210. However, in alternative embodiments it is contemplated that such instructions may be issued directly from IFU 200 to their respective units without passing through one of EXUs 210.

Floating point/graphics unit 220 may be configured to execute and provide results for certain floating-point and graphics-oriented instructions defined in the implemented ISA. For example, in one embodiment FGU 220 may implement single- and double-precision floating-point arithmetic instructions compliant with the IEEE 754 floating-point standard, such as add, subtract, multiply, divide, and certain transcendental functions. Also, in one embodiment FGU 220 may implement partitioned-arithmetic and graphics-oriented instructions defined by a version of the SPARC® Visual Instruction Set (VIS™) architecture, such as VIS™ 2.0. Additionally, in one embodiment FGU 220 may implement certain integer instructions such as integer multiply, divide, and population count instructions, and may be configured to perform multiplication operations on behalf of stream processing unit 240. Depending on the implementation of FGU 220, some instructions (e.g., some transcendental or extended-precision instructions) or instruction operand or result scenarios (e.g., certain denormal operands or expected results) may be trapped and handled or emulated by software.

In the illustrated embodiment, FGU 220 may be configured to store floating-point register state information for each thread in a floating-point register file. In one embodiment, FGU 220 may implement separate execution pipelines for floating point add/multiply, divide/square root, and graphics operations, while in other embodiments the instructions implemented by FGU 220 may be differently partitioned. In various embodiments, instructions implemented by FGU 220 may be fully pipelined (i.e., FGU 220 may be capable of starting one new instruction per execution cycle), partially pipelined, or may block issue until complete, depending on the instruction type. For example, in one embodiment floating-point add operations may be fully pipelined, while floating-point divide operations may block other divide/square root operations until completed.

Load store unit 230 may be configured to process data memory references, such as integer and floating-point load and store instructions as well as memory requests that may originate from stream processing unit 240. In some embodiments, LSU 230 may also be configured to assist in the processing of instruction cache 204 misses originating from IFU 200. LSU 230 may include a data cache 235 as well as logic configured to detect cache misses and to responsively request data from L2 cache 120 via crossbar interface 260. In one embodiment, data cache 235 may be configured as a write-through cache in which all stores are written to L2 cache 120 regardless of whether they hit in data cache 235; in some such embodiments, stores that miss in data cache 235 may cause an entry corresponding to the store data to be allocated within the cache. In other embodiments, data cache 235 may be implemented as a write-back cache.

In one embodiment, LSU 230 may include a miss queue configured to store records of pending memory accesses that have missed in data cache 235 such that additional memory accesses targeting memory addresses for which a miss is pending may not generate additional L2 cache request traffic. In the illustrated embodiment, address generation for a load/store instruction may be performed by one of EXUs 210. Depending on the addressing mode specified by the instruction, one of EXUs 210 may perform arithmetic (such as adding an index value to a base value, for example) to yield the desired address. Additionally, in some embodiments LSU 230 may include logic configured to translate virtual data addresses generated by EXUs 210 to physical addresses, such as a Data Translation Lookaside Buffer (DTLB).

Stream processing unit 240 may be configured to implement one or more specific data processing algorithms in hardware. For example, SPU 240 may include logic configured to support encryption/decryption algorithms such as Advanced Encryption Standard (AES), Data Encryption Standard/Triple Data Encryption Standard (DES/3DES), or Ron's Code #4 (RC4). SPU 240 may also include logic to implement hash or checksum algorithms such as Secure Hash Algorithm (SHA-1, SHA-256), Message Digest 5 (MD5), or Cyclic Redundancy Checksum (CRC). SPU 240 may also be configured to implement modular arithmetic such as modular multiplication, reduction and exponentiation. In one embodiment, SPU 240 may be configured to utilize the multiply array included in FGU 220 for modular multiplication. In various embodiments, SPU 240 may implement several of the aforementioned algorithms as well as other algorithms not specifically described.

SPU 240 may be configured to execute as a coprocessor independent of integer or floating-point instruction execution. For example, in one embodiment SPU 240 may be configured to receive operations and operands via control registers accessible via software; in the illustrated embodiment SPU 240 may access such control registers via LSU 230. In another embodiment SPU 240 may receive operations and operands decoded and issued from the instruction stream by IFU 200. In some embodiments, SPU 240 may be configured to freely schedule operations across its various algorithmic subunits independent of other functional unit activity. Additionally, SPU 240 may be configured to generate memory load and store activity. In the illustrated embodiment, SPU 240 may interact directly with crossbar interface 260 for such memory activity, while in other embodiments SPU 240 may coordinate memory activity through LSU 230. In one embodiment, software may poll SPU 240 through one or more control registers to determine result status and to retrieve ready results, for example by accessing additional control registers. In other embodiments, FGU 220, LSU 230 or other logic may be configured to poll SPU 240 at intervals to determine whether it has ready results to write back. In still other embodiments, SPU 240 may be configured to generate a trap when a result is ready, to allow software to coordinate result retrieval and processing.

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 204 or data cache 235. In the event no translation for a given virtual page number is found in the appropriate TLB, memory management unit 250 may be configured to provide a translation. In one embodiment, MMU 250 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk.) In some embodiments, if MMU 250 is unable to derive a valid address translation, for example if one of the memory pages including a necessary page table is not resident in physical memory (i.e., a page miss), MMU 250 may be configured to generate a trap to allow a memory management software routine to handle the translation. It is contemplated that in various embodiments, any desirable page size may be employed. Further, in some embodiments multiple page sizes may be concurrently supported.

A number of functional units in the illustrated embodiment of core 100 may be configured to generate off-core memory or I/O requests. For example, IFU 200 or LSU 230 may generate access requests to L2 cache 120 in response to their respective cache misses. SPU 240 may be configured to generate its own load and store requests independent of LSU 230, and MMU 250 may be configured to generate memory requests while executing a page table walk. Other types of off-core access requests are possible and contemplated. In the illustrated embodiment, crossbar interface 260 may be configured to provide a centralized interface to the port of crossbar 110 associated with a particular core 100, on behalf of the various functional units that may generate accesses that traverse crossbar 110. In one embodiment, crossbar interface 260 may be configured to maintain queues of pending crossbar requests and to arbitrate among pending requests to determine which request or requests may be conveyed to crossbar 110 during a given execution cycle. For example, crossbar interface 260 may implement a least-recently-used or other algorithm to arbitrate among crossbar requestors. In one embodiment, crossbar interface 260 may also be configured to receive data returned via crossbar 110, such as from L2 cache 120 or I/O interface 140, and to direct such data to the appropriate functional unit (e.g., data cache 235 for a data cache fill due to miss). In other embodiments, data returning from crossbar 110 may be processed externally to crossbar interface 260.

During the course of operation of some embodiments of core 100, exceptional events may occur. For example, an instruction from a given thread that is picked for execution by pick unit 206 may be not be a valid instruction for the ISA implemented by core 100 (e.g., the instruction may have an illegal opcode), a floating-point instruction may produce a result that requires further processing in software, MMU 250 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 270 may be configured to manage the handling of such events. For example, TLU 270 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 270 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 270 may implement such traps as precise traps. That is, TLU 270 may ensure that all instructions from the given thread that occur before the trapping instruction (in program order) complete and update architectural state, while no instructions from the given thread that occur after the trapping instruction (in program) order complete or update architectural state.

Example Core Pipeline Diagram

Figure 2:
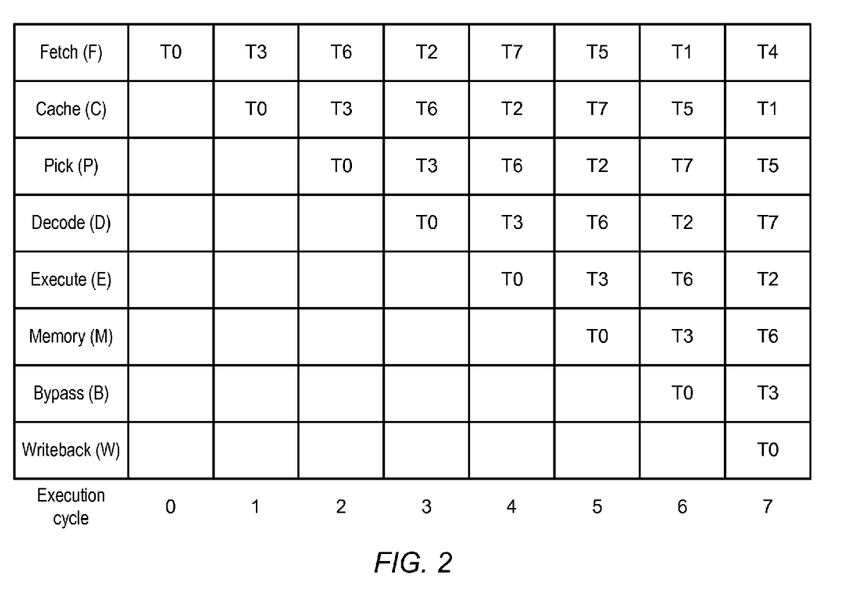
FIG. 2 is a pipeline diagram illustrating an embodiment of instruction execution in a fine-grained multithreaded processor core.

In the illustrated embodiment, core 100 may be configured for pipelined execution, in which processing of new instructions may begin before older instructions have completed, such that multiple instructions from various threads may be in various stages of processing during a given core execution cycle. A pipeline diagram illustrating the flow of integer instructions through one embodiment of core 100 is shown in FIG. 2. In the illustrated embodiment, execution of integer instructions is divided into eight stages, denoted Fetch (F), Cache (C), Pick (P), Decode (D), Execute (E), Memory (M), Bypass (B), and Writeback (W). In other embodiments, it is contemplated that different numbers of pipe stages corresponding to different types of functionality may be employed. It is further contemplated that other pipelines of different structure and depth may be implemented for integer or other instructions. For example, floating-point instructions may execute in a longer pipeline than integer instructions.

The first four stages of the illustrated integer pipeline may generally correspond to the functioning of IFU 200. In one embodiment, during the Fetch stage, one or more threads to fetch may be selected, and instruction cache 204 may be accessed for the selected thread. During the Cache stage, fetch unit 202 may determine whether the access of the previous cycle hit or missed the cache. If the access hit, the instructions read from the cache may be stored in instruction buffers. During the Pick stage, pick unit 206 may be configured in one embodiment to select at most two instructions to issue, one for each thread group as described above. Source dependencies of the selected instructions on previously issued instructions may also be detected during the Pick stage. During the Decode stage, decode unit 208 may be configured to decode the selected instructions and to determine whether resource hazards exist as described above. For integer operations, data operands may also be selected during the Decode stage. For example, operands may be retrieved from an integer register file, or bypass logic may be configured to bypass operands from another pipe stage.

During the Execute stage, one or both of execution units 210 may be active to compute an instruction result. If an instruction in the integer execution pipeline is not a load or store instruction, in the illustrated embodiment it may be idle during the Memory and Bypass stages before its result is committed (i.e., written back to the integer register file) in the Writeback stage. A load or store instruction may have its address calculated by one of execution units 210 during the Execute stage. During the Memory stage of a load instruction, data cache 235 may be accessed, while during the Bypass stage, LSU 230 may determine whether a data cache hit or miss occurred. In the hit case, data may be forwarded to the appropriate execution unit 210 (e.g., dependent on the thread group of the load instruction) to be committed during the Writeback stage. In one embodiment, store instructions and load instructions that miss data cache 235 may execute with different pipeline timing than shown in FIG. 2.

In the illustrated embodiment, integer instructions are depicted as executing back-to-back in the pipeline without stalls. In execution cycles 0 through 7, instructions from threads 0, 3, 6, 2, 7, 5, 1 and 4 enter the Fetch stage, respectively, though in other embodiments, instructions may issue from various threads in a different order according to the operation of pick unit 206. In some instances, other instructions issued prior to execution cycle 0 may also be in the pipeline. Additionally, in some embodiments, two different instructions from the same or different threads may execute during the same pipeline stage. For example, in the illustrated embodiment of core 100, one integer instruction may be issued to each of execution units 210 in a single cycle.

By execution cycle 7, it is noted that each stage of the pipeline holds an instruction from a different thread in a different stage of execution, in contrast to conventional processor implementations that typically require a pipeline flush when switching between threads or processes. In some embodiments, flushes and stalls due to resource conflicts or other scheduling hazards may cause some pipeline stages to have no instruction during a given cycle. However, in the fine-grained multithreaded processor implementation employed by the illustrated embodiment of core 100, such flushes and stalls may be directed to a single thread in the pipeline, leaving other threads undisturbed. Additionally, even if one thread being processed by core 100 stalls for a significant length of time (for example, due to an L2 cache miss), instructions from another thread may be readily selected for issue, thus increasing overall thread processing throughput.

Processor Configurations Including Multiple Multithreaded Cores

Figure 3:
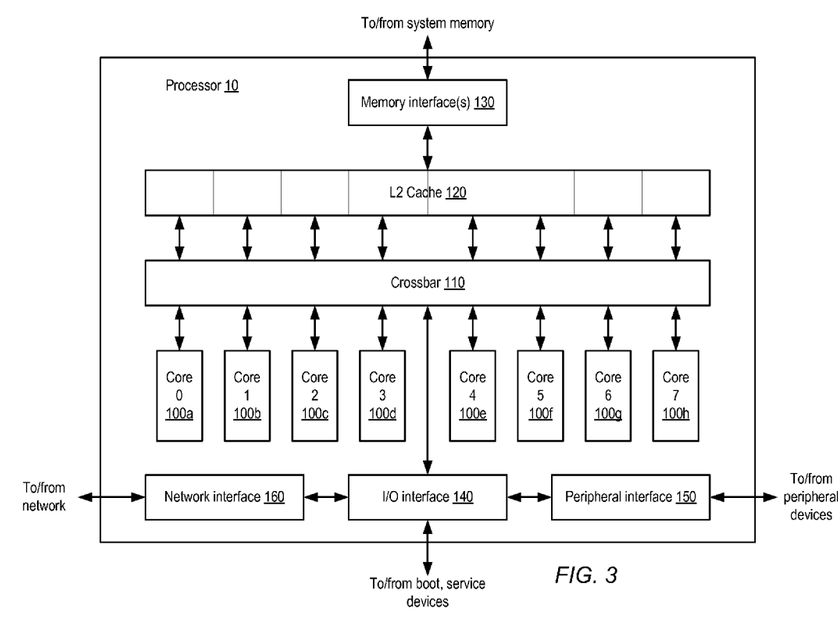
FIG. 3 is a block diagram illustrating an embodiment of a multithreaded processor.

In various embodiments, a multicore processor may include a number of instances of core 100, as well as other features. One example of an 8-core processor is shown in FIG. 3. In the illustrated embodiment, processor 10 includes eight instances of core 100 denoted cores 100*a-h* and also designated "core 0" though "core 7." Each of cores 100 is coupled to an L2 cache 120 via a crossbar 110. L2 cache 120 is coupled to one or more memory interface(s) 130, which are coupled in turn to one or more banks of system memory (not shown). Additionally, crossbar 110 couples cores 100 to input/output (I/O) interface 140, which is in turn coupled to a peripheral interface 150 and a network interface 160. As described in greater detail below, I/O interface 140, peripheral interface 150 and network interface 160 may respectively couple processor 10 to boot and/or service devices, peripheral devices, and a network.

Crossbar 110 may be configured to manage data flow between cores 100 and the shared L2 cache 120. In one embodiment, crossbar 110 may include logic (such as multiplexers or a switch fabric, for example) that allows any core 100 to access any bank of L2 cache 120, and that conversely allows data to be returned from any L2 bank to any core 100. Crossbar 110 may be configured to concurrently process data requests from cores 100 to L2 cache 120 as well as data responses from L2 cache 120 to cores 100. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple cores 100 attempt to access a single bank of L2 cache 120 or vice versa.

L2 cache 120 may be configured to cache instructions and data for use by cores 100. In the illustrated embodiment, L2 cache 120 may be organized into eight separately addressable banks that may each be independently accessed, such that in the absence of conflicts, each bank may concurrently return data to a respective core 100. In some embodiments, each individual bank may be implemented using set-associative or direct-mapped techniques. For example, in one embodiment, L2 cache 120 may be a 4 megabyte (MB) cache, where each 512 kilobyte (KB) bank is 16-way set associative with a 64-byte line size, although other cache sizes and geometries are possible and contemplated. L2 cache 120 may be implemented in some embodiments as a writeback cache in which written (dirty) data may not be written to system memory until a corresponding cache line is evicted.

In some embodiments, L2 cache 120 may implement queues for requests arriving from and results to be sent to crossbar 110. Additionally, in some embodiments L2 cache 120 may implement a fill buffer configured to store fill data arriving from memory interface 130, a writeback buffer configured to store dirty evicted data to be written to memory, and/or a miss buffer configured to store L2 cache accesses that cannot be processed as simple cache hits (e.g., L2 cache misses, cache accesses matching older misses, accesses such as atomic operations that may require multiple cache accesses, etc.). L2 cache 120 may variously be implemented as single-ported or multiported (i.e., capable of processing multiple concurrent read and/or write accesses). In either case, L2 cache 120 may implement arbitration logic to prioritize cache access among various cache read and write requestors.

Memory interface 130 may be configured to manage the transfer of data between L2 cache 120 and system memory, for example in response to L2 fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2 Synchronous Dynamic Random Access Memory (DDR/DDR2 SDRAM), or Rambus® DRAM (RDRAM®), for example. In some embodiments, memory interface 130 may be configured to support interfacing to multiple different types of system memory.

In the illustrated embodiment, processor 10 may also be configured to receive data from sources other than system memory. I/O interface 140 may be configured to provide a central interface for such sources to exchange data with cores 100 and/or L2 cache 120 via crossbar 110. In some embodiments, I/O interface 140 may be configured to coordinate Direct Memory Access (DMA) transfers of data between network interface 160 or peripheral interface 150 and system memory via memory interface 130. In addition to coordinating access between crossbar 110 and other interface logic, in one embodiment I/O interface 140 may be configured to couple processor 10 to external boot and/or service devices. For example, initialization and startup of processor 10 may be controlled by an external device (such as, e.g., a Field Programmable Gate Array (FPGA)) that may be configured to provide an implementation- or system-specific sequence of boot instructions and data. Such a boot sequence may, for example, coordinate reset testing, initialization of peripheral devices and initial execution of processor 10, before the boot process proceeds to load data from a disk or network device. Additionally, in some embodiments such an external device may be configured to place processor 10 in a debug, diagnostic, or other type of service mode upon request.

Peripheral interface 150 may be configured to coordinate data transfer between processor 10 and one or more peripheral devices. Such peripheral devices may include, without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of an interface such as Peripheral Component Interface Express (PCI Express™), although it is contemplated that any suitable interface standard or combination of standards may be employed. For example, in some embodiments peripheral interface 150 may be configured to implement a version of Universal Serial Bus (USB) protocol or IEEE 1394 (Firewire®) protocol in addition to or instead of PCI Express™

Network interface 160 may be configured to coordinate data transfer between processor 10 and one or more devices (e.g., other computer systems) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, network interface 160 may be configured to implement multiple discrete network interface ports.

Figure 4:
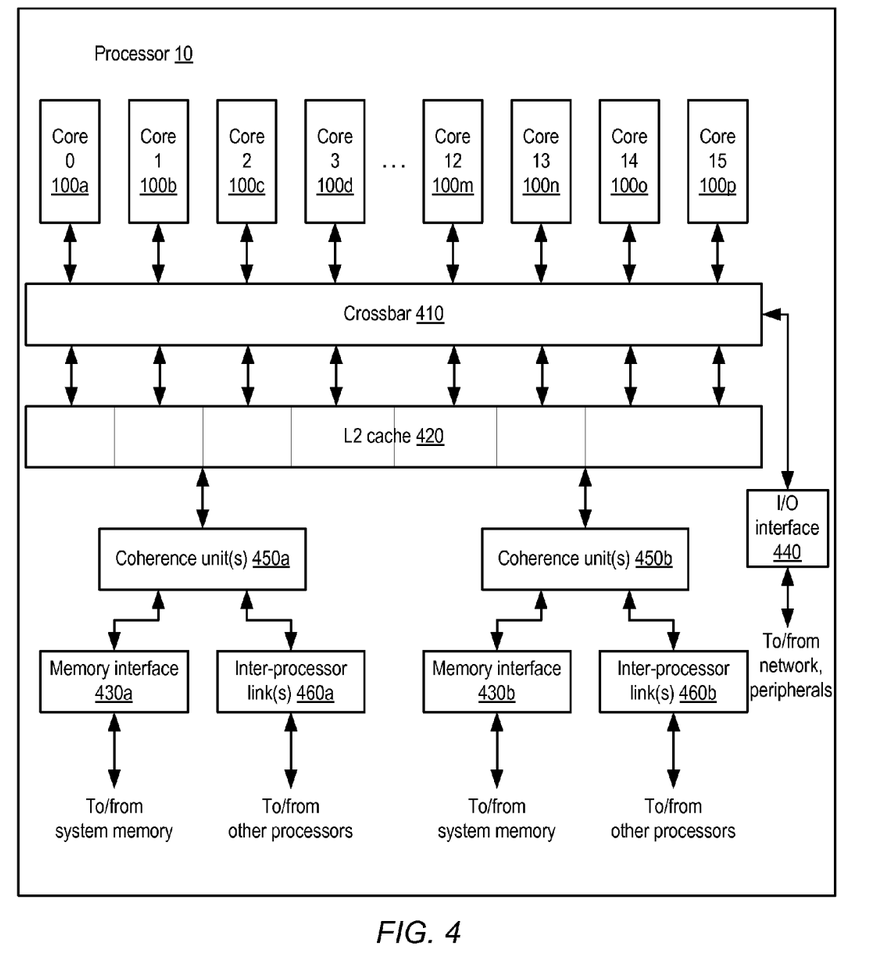
FIG. 4 is a block diagram illustrating another embodiment of a multithreaded processor.

Other possible configurations of processor 10 may include more or fewer processor cores than the version shown in FIG. 3, and may also include other or different features. FIG. 4 illustrates one such alternative embodiment. In the embodiment shown in FIG. 4, processor 10 includes 16 instances of cores 100 denoted cores 100a-p as well as "core 0" through "core 15," although for clarity, not all instances are shown in FIG. 4. Cores 100 are coupled to an L2 cache 420 as well as an I/O interface 440 through a crossbar 410. L2 cache 420 is coupled to coherence units 450a-b, which are in turn respectively coupled to memory interfaces 430a-b and inter-processor links 460a-b. It is noted that in various embodiments, the organization of FIG. 4 may represent a logical organization rather than a physical organization, and other components may also be employed. For example, in some embodiments, cores 100 and banks of L2 cache 420 may not connect directly to crossbar 410, but may instead interface with the crossbar through intermediate logic.

Like crossbar 110 discussed above, crossbar 410 may be configured to manage data flow between cores 100 and the shared L2 cache 420. In various embodiments, crossbar 410 may be implemented using any of the features or characteristics noted above with respect to crossbar 110. In particular, crossbar 410 may be configured to facilitate the exchange of data between any core 100 and any bank of L2 cache 420.

L2 cache 420 may be configured to cache instructions and data for use by cores 100, in a manner similar to L2 cache 120 discussed above. As the number of cores 100 is increased, the size of L2 cache 420 may also be increased in order to accommodate the additional cores 100. For example, in an embodiment including 16 cores 100, L2 cache 420 may be configured as a 6 MB cache including 16 individual cache banks of 384 KB, where each bank may be 24-way set associative with 256 sets and a 64-byte line size, although any other suitable cache size or geometry may also be employed.

As with L2 cache 110, in some embodiments, L2 cache 420 may include various queues and buffers configured to manage the flow of data to and from crossbar 410 as well as to and from coherence units 450a-b. For example, L2 cache 420 may implement a fill buffer, writeback buffer, and/or miss buffer such as described above with respect to L2 cache 110. In some embodiments, multiple banks of L2 cache 420 may share single instances of certain data structures or other features. For example, a single instance of a fill buffer may be shared by multiple banks of L2 cache 420 in order to simplify the physical implementation (e.g., routing and floorplanning) of L2 cache 420. Despite this sharing, individual banks of L2 cache 420 may be configured to concurrently and independently process accesses to data stored within the banks when such concurrency is possible.

I/O interface 440 may be configured to present cores 100 and/or L2 cache 420 with access to data from a source other than system memory. Like I/O interface 140 (discussed above), I/O interface 440 may be configured to coordinate access to a network and/or peripheral interface, boot devices, or other suitable devices. Though not shown in FIG. 4, processor 10 may include network and peripheral interfaces similar to those shown in FIG. 3 and discussed above.

In some embodiments, processor 10 may be configured for use in multiprocessor systems in which multiple instances of processor 10 may share a common physical memory address space. For example, a multiprocessor system might include two, four, or some other number of processors 10. Each instance of processor 10 might be coupled to its own system memory (e.g., via memory interfaces 430a-b, as discussed below). However, each processor 10 may also be configured to access system memory that is coupled to a remote processor 10 other than itself.

Typically, in systems where more than one processor is capable of accessing the same memory address space, some type of coherence protocol may be used to ensure that the different processors present consistent memory behavior to executing software. For example, if two different processors attempted to write to the same memory address without some type of coordination, the same sequence of executing instructions that depends on data stored at that memory address might give different results on different occasions, depending upon which processor happened to be the first to write the data. A coherence protocol may require processors to coordinate with one another prior to acting on data (e.g., reading or writing to memory addresses) in order to prevent inconsistent execution behavior.

For example, a coherence protocol may define a set of states that characterize the coherence status of a unit of memory, such as a cache line. Such states may reflect the status of a unit of memory (e.g., a memory word, cache line, or coherence block) with respect to a particular processor. For example, according to the MESI coherence protocol, the coherence states may indicate to a given processor that the memory unit has been modified (M) by the given processor, is unmodified but exclusively resident (E) in the cache of the given processor, is unmodified and shared (S) by the given processor and at least one other processor (i.e., resident in multiple processors' caches), or is invalid (I) with respect to the given processor. Additionally, the coherence protocol may specify particular events that cause transitions among the various coherence states. For example, a version of the MESI protocol may require that before a processor can modify a unit of memory, it must first obtain exclusive access to that unit, which may be accomplished by invalidating any copies of that unit held by other processors. (It is noted that the MESI protocol is merely one example of a coherence protocol, and that other protocols involving additional or different states as well as state transitions are possible and contemplated.)

In various embodiments, coherence units 450*a-b* may be configured to implement and enforce a particular coherence protocol in order to coordinate memory accesses among multiple processors 10. For example, coherence units 450*a-b* may be configured to receive read or write requests that originate from L2 cache 420 (e.g., in response to cache misses), and to maintain data structures indicative of the coherence status of units of memory. In various embodiments, such data structures may include arrays of status bits that indicate the coherence status of various memory units with respect to the local processor 10, coherence directories that indicate coherence information with respect to all processors 10 within the system, or other suitable data structures. Any suitable granularity may be chosen for the unit of memory. For example, coherence units 450 may track coherence on the basis of the cache line size as defined by L2 cache 420, or may define a coherence block of some other size.

In some embodiments, individual ones of coherence units 450 may be dedicated to processing requests received from specific corresponding banks of L2 cache 420. For example, coherence units 450*a-b* might be configured to process even and odd banks of L2 cache 420, respectively, although any other suitable mapping of banks to coherence units may be employed, and other numbers of coherence units may be implemented. In other embodiments, any coherence unit 450 may be configured to process a request from any bank of L2 cache 420.

When coherence units 450*a-b* receive read or write requests, they may be configured to consult stored coherence state information and to coordinate transactions that may be necessary to complete the request. For example, depending on the coherence protocol employed, it may be necessary to invalidate another processor's copy of data before locally modifying it, or to obtain the most current copy of data from another processor if a local copy is invalid. Correspondingly, coherence units 450 may communicate with local system memory via memory interfaces 430*a-b*, as well as remote processors via inter-processor links 460*a-b*, in order to carry out transactions that accomplish data transfers and/or coherence state changes among these various entities.

Like memory interface 130 discussed above, memory interfaces 430*a-b* may be configured to manage the transfer of data between L2 cache 420 and system memory, via coherence units 450. Inter-processor links 460*a-b* may be configured to provide direct communication between instances of processor 10, e.g., for the exchange of memory data, I/O data, coherence control information, or other inter-processor communication. For example, these links may be implemented as high-speed serial point-to-point interconnects, such that each processor 10 may have one or more direct communication paths to the other processors 10. Alternative interconnect topologies such as shared buses, rings, cubes, etc. may also be employed.

Writeback Buffer Configurations

As mentioned above, in some embodiments, L2 cache 120 or L2 cache 420 may be configured as a writeback cache. Generally speaking, in a writeback cache, stores that hit in the cache are written to the cache without being immediately written to lower levels of the memory hierarchy (e.g., system memory). Instead, modified cache data may be written to lower levels of memory when the modified data is evicted from the cache, which may enable the stores to complete more quickly than if lower levels were updated concurrently with the cache (e.g., in the case of a write-through cache). Evictions may occur, for example, when a cache line is deliberately flushed by software or hardware, such as by execution of an instruction that causes a flush or the occurrence of a fault or trap that requires a flush. In another case, evictions may occur when a cache fill that occurs in response to a load miss forces the eviction of existing cache data to make room for the fill data. For example, in a set-associative cache, if all ways of a particular set are occupied by valid data when fill data is ready to be written to the particular set, then to make room for the fill data, one way may be chosen for eviction according to a suitable algorithm (e.g., least recently used, least frequently used, etc.).

Often, the latency required to access a lower level of a memory hierarchy from a writeback cache (e.g., to access a lower-level cache or system memory) is higher than the access latency of the writeback cache itself, owing to factors such as the size and organization of the lower-level memory as well as its distance from the writeback cache. For example, a read or write to system memory may incur several times the latency of an access to the writeback cache. Accordingly, in some embodiments, a writeback buffer may be employed to provide temporary storage for evicted data after the eviction occurs and before the evicted data has been successfully written to the lower level memory. Such buffering may improve cache performance by allowing fill data to occupy the writeback cache immediately upon eviction, rather than waiting for lower-level writeback of the evicted data to complete. (In the following discussion, when evictions are mentioned, it will be generally presumed that the evicted data is in fact modified and requires writeback. However, it is noted that unmodified data may also be subject to eviction from a writeback cache. In this case, the evicted data may simply be discarded without writing it back to a lower-level memory. Thus, not every possible case of eviction will involve a writeback.)

Figure 5:
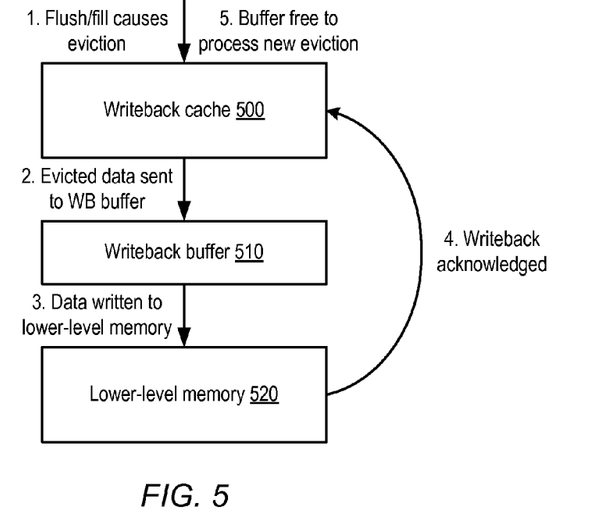
FIG. 5 is a block diagram illustrating an embodiment of a writeback cache.

One example of how a writeback buffer may be interposed between a writeback cache and a lower-level memory is illustrated in FIG. 5. In the illustrated embodiment, a writeback cache 500 is coupled to a writeback buffer 510, which is in turn coupled to a lower-level memory 520. (It is noted that other elements may also be interposed between writeback cache 500 and lower-level memory 520; however, for simplicity, these are not shown.) In some embodiments, writeback cache 500 may correspond to L2 cache 120 or L2 cache 420 discussed above, while lower-level memory 520 may correspond to a system memory such as may be coupled to processor 10 as discussed above with respect to FIGS. 3 and 4. (In some embodiments, lower-level memory 520 may also encompass intervening elements used to control access to the lower-level memory, such as coherence units 450 and memory interfaces 430.) However, in other embodiments, both writeback cache 500 and lower-level memory 520 may correspond to any suitable entities in a memory hierarchy. For example, lower-level memory 520 could correspond to a third-level cache, or writeback cache 500 and lower-level memory 520 could correspond to first- and second-levels caches respectively.

Writeback buffer 510 may be configured to store data evicted from writeback cache 500 before the evicted data is finally written back to lower-level memory 520. For example, writeback buffer 510 may be implemented using flip-flops, a storage array, a content-addressable memory (CAM), or any other suitable storage technology. Writeback buffer 510 may generally be sized to store the full unit of data evicted from writeback cache 500, although pipelined embodiments of writeback buffer 510 are possible. For example, if writeback cache 500 is configured to evict a full cache line, writeback buffer 510 may be configured to store the full cache line, with the line being written in its entirety or over several cycles. In some embodiments, writeback buffer 510 may be configured to store evicted data for multiple outstanding evictions. For example, writeback buffer 510 may include multiple entries, and control logic in writeback cache 500 or writeback buffer 510 may be configured to allocate and deallocate those entries as evictions occur and are completed.

FIG. 5 illustrates one example of how writeback processing may occur. First, some event such as a cache flush or fill may cause data to be evicted from writeback cache 500. The evicted data may then be written into writeback buffer 510, and ultimately written to lower-level memory 520. Once the writeback to lower-level memory 520 is complete, completion of the writeback may be acknowledged to writeback cache 500, and writeback buffer 510 (or the particular entry that was allocated for this eviction, in the case where writeback buffer 510 supports multiple entries) may be freed to process a new eviction.

It is noted that while FIG. 5 primarily illustrates the flow of data, there may also be control handshaking that occurs among the various illustrated entities. For example, writeback cache 500 may not allow an eviction to occur if writeback buffer 510 signals that it cannot accommodate new eviction data (e.g., because it still contains data from a prior eviction not yet acknowledged as complete by lower-level memory 520). Similarly, lower-level memory 520 may signal its readiness to accept eviction data from writeback buffer 510, which as noted above, may occur with a substantially longer latency than is exhibited by writeback cache 500.

Owing to these control relationships, it is possible for downstream delays in writeback processing to propagate up through the hierarchy of processor 10 (a phenomenon that may also be referred to as "backpressure"). For example, if writeback buffer 510 is full and awaiting acceptance of data by lower-level memory 520, no further evictions may be possible. This may delay the completion of a cache fill that requires an eviction, which in turn may delay the completion of a load instruction that missed in writeback cache 500 and is awaiting completion of the cache fill in order to execute. If other instructions are dependent upon the load instruction, code execution may stall entirely until progress in the writeback pipeline can be made. Thus, writeback performance has the potential to substantially degrade instruction execution performance under certain conditions.

For example, a sequence of multiple load instructions or instruction fetches may be directed to the same set of writeback cache 500. (Such a situation may be relatively common during execution, because in many computational workloads, memory accesses are statistically likely to occur near one another within the memory address space.) If multiple ones of these accesses miss within writeback cache 500, a number of cache fills may occur close together in time. These fills, being directed to the same set, may in turn cause multiple evictions (e.g., in a "warm cache" scenario where the multiple cache ways of the set had been previously populated with valid data by prior cache fills). If these evictions occur closer together in time than lower-level memory 520 is capable of completing the writebacks, backpressure may occur, causing the sequence of instructions or fetches to stall.

Figure 6:
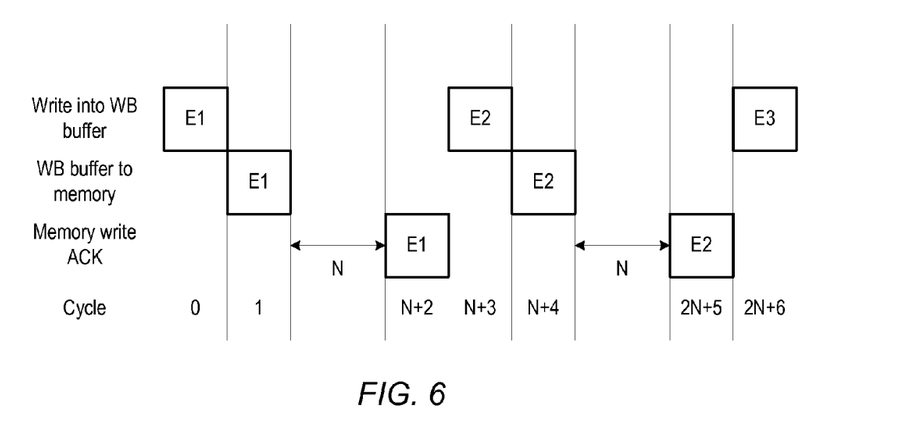
FIG. 6 is a timing diagram illustrating an embodiment of operation of a writeback cache.

FIG. 6 shows a timing diagram illustrating an example of how evictions may be processed by the embodiment shown in FIG. 5. In the illustrated embodiment, data for an eviction E1 is written into writeback buffer 510 during cycle 0, and is sent to lower-level memory 520 during cycle 1. Then, lower-level memory 520 takes a number of cycles N before an acknowledgement of the writeback is returned in cycle N+2. Following the acknowledgement, writeback buffer 510 is free to accept data for another eviction E2 at cycle N+3. Assuming eviction E2 completes with the same latency as E1, eviction E3 may enter writeback buffer 510 at cycle 2N+6.

It is noted that FIG. 6 illustrates hypothetical, best-case writeback timing rather than exact timing. In various embodiments, there may be more stages of processing involved, the various stages may take various amounts of time, and the latencies of different stages may vary on different occasions. For example, some number of cycles may elapse between the time writeback buffer 510 is written and the time its data is transferred to lower-level memory 520. Depending on factors such as other memory and I/O activity, the acknowledgement from lower-level memory 520 may arrive after more than N cycles. Also, other levels of delay (e.g., due to coherence processing) may be introduced by other elements. Nevertheless, FIG. 6 shows that even under favorable timing assumptions, if the latency N of lower-level memory 520 is large, it may dominate the latency of writeback processing, which may limit the overall rate at which writebacks may be completed and possibly cause backpressure-induced upstream processing delays as mentioned above.

One way that writeback performance may be improved is to increase the size of writeback buffer 510. If a greater number of pending evictions can be buffered, then more evictions can be performed by writeback cache 500 during a given period of time, even if the latency of lower-level memory 520 remains the same. However, increasing writeback buffer size may not be a practical solution. For example, in some embodiments, each bank of L2 cache 420 might include its own writeback buffer, or might share a writeback buffer with one or more adjacent cache banks. As the number of banks is increased (e.g., to 16 in the embodiment of FIG. 4, from 8 in the embodiment of FIG. 3), the cumulative effect of increasing writeback buffer size as well as providing routing for additional entries may complicate the physical design of processor 10, increasing overall processor size and power consumption.

Figure 7:
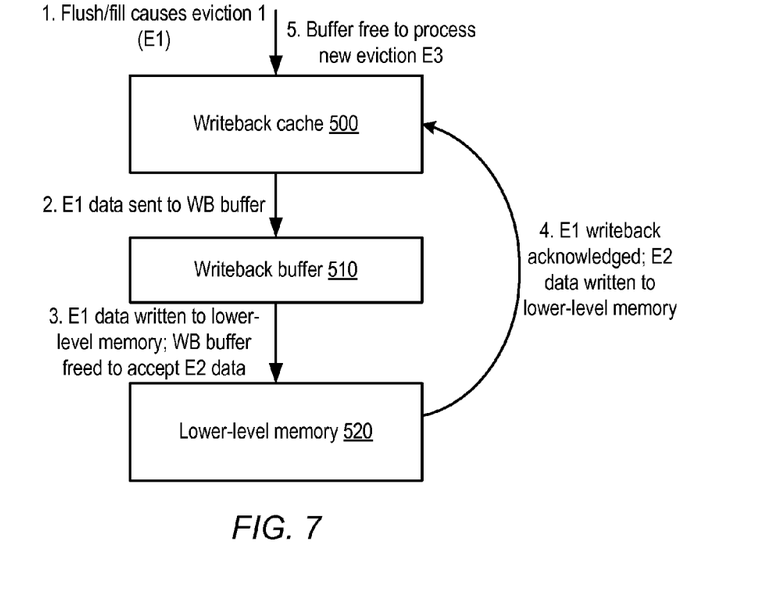
FIG. 7 is a block diagram illustrating an embodiment of a writeback cache supporting writeback buffer reuse.
Figure 8:
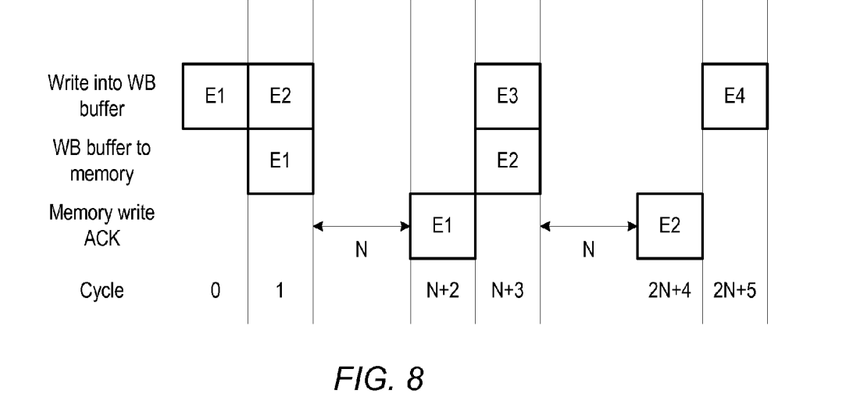
FIG. 8 is a timing diagram illustrating an embodiment of operation of a writeback cache that includes support for writeback buffer reuse.

FIGS. 7-8 illustrate an embodiment of a writeback buffer implementation that may increase the effective capacity of writeback buffer 510 from the perspective of writeback cache 500, without actually increasing the buffer's physical data storage capacity. In the embodiment of FIG. 7, writeback cache 500, writeback buffer 510, and lower-level memory 520 may be substantially the same as the elements of FIG. 5 with respect to their general organization and function, but may differ in the details of writeback timing.

As described above, in the embodiment of FIGS. 5-6, a new eviction may not be allowed to write into writeback buffer 510 until completion of the previous eviction has been acknowledged by lower-level memory 520. However, in some embodiments, once data has been sent from writeback buffer 510 to lower-level memory 520 for writeback, there may be no further need for the data itself. For example, lower-level memory 520 may be configured to guarantee that a writeback will complete after a sufficient amount of time has passed, leaving no reason for writeback data to be retained upstream after it has been accepted by lower-level memory 520. In such cases, writeback completion becomes a matter of handling control information (e.g., the writeback acknowledgement) rather than data. Therefore, by decoupling the data and control aspects of a write operation, it may be possible to utilize writeback buffer 510 to store writeback data for a subsequent eviction before the completion of a prior eviction has been acknowledged by lower-level memory 520. This may also be referred to as "writeback buffer reuse," in that writeback buffer 510 is being used to store new data for a subsequent writeback while a prior writeback is still outstanding.

FIGS. 7-8 illustrate one way in which such decoupling may be accomplished. As an example, referring to FIG. 7, eviction E1 may occur in writeback cache 500, and the corresponding data may be written into writeback buffer 510. Then, the data for eviction E1 may be sent to lower-level memory 520. As noted above, when this occurs, there may no longer be any need to retain the data for E1 within writeback buffer 510. Thus, in the illustrated embodiment, writeback buffer 510 may be freed to accept the data corresponding to a second eviction E2 occurring after E1, and to do so before lower-level memory 520 acknowledges the writeback of E1. Once writeback of E1 has been acknowledged, writeback data for E2 may be written to lower-level memory, and writeback buffer 510 may be freed to accept data from a third eviction E3, and so forth.

FIG. 8 illustrates an example of the timing for the embodiment of FIG. 7. In particular, FIG. 8 shows that the time at which eviction E2 occupies writeback buffer 510 has moved from cycle N+3 in the embodiment of FIG. 5 to cycle 1. Once eviction E1 has been acknowledged in cycle N+2, eviction E2 may be sent to lower-level memory 520, and eviction E3 may occupy writeback buffer 510 in cycle N+3.

As noted above with respect to FIG. 6, in various embodiments, the exact timing of the events shown in FIG. 8 may vary. For example, depending on the implementation, eviction E2 might not write to writeback buffer 510 immediately after eviction E1 vacates it. However, despite these variances, it is noted that in the various embodiments of FIG. 7, two different writeback operations may be concurrently outstanding, while in the embodiment of FIG. 5, only one writeback operation at a time was outstanding. Thus, in the embodiment of FIG. 7, writeback cache 500 may effectively be able to accommodate twice the number of concurrent evictions as the embodiment of FIG. 5, without increasing the overall data storage capacity of writeback buffer 510. This in turn may improve the overall performance of processor 10, by reducing the effects of writeback processing backpressure from lower levels of the memory hierarchy on higher levels and ultimately on instruction throughput. It is noted that the techniques described here may be applied with respect to each entry of a multiple-entry embodiment of writeback buffer 510, such that, e.g., a four-entry buffer may be able to accommodate eight outstanding writeback operations, and so forth.

Figure 9:
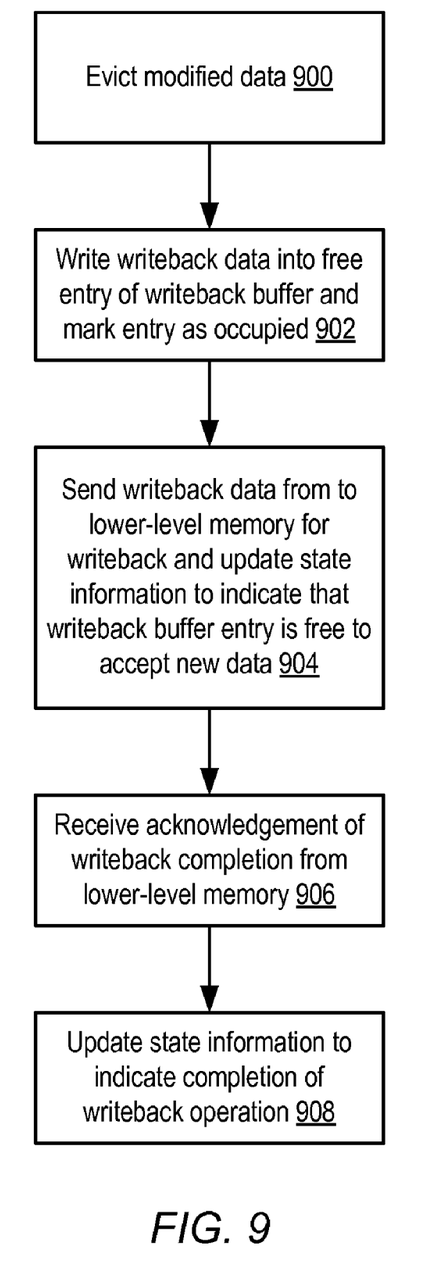
FIG. 9 is a flow diagram illustrating the operation of an embodiment of a processor including support for writeback buffer reuse.

FIG. 9 illustrates an embodiment of a general method of writeback processing operation of embodiments of processor 10. Operation begins in block 900 where an eviction of modified data (i.e., writeback data) occurs. For example, as mentioned above, cache fills or other cache-related events may cause evictions from writeback cache 500.

The writeback data is then written into a free entry of a writeback buffer, and the free entry is marked as occupied (block 902). For example, state information within writeback buffer 510 or within writeback cache 500 may be configured to indicate the status of each entry of writeback buffer 510. Such status information may include whether the entry is free for use or instead holds data that is awaiting transfer to lower-level memory 520. In some embodiments, if no free writeback buffer entry exists, pending evictions of modified data may be held or prevented from occurring until writeback buffer resources become available.

In some embodiments, state information may also be stored with respect to individual writeback operations (e.g., by writeback cache 500 or some other entity). Such state information may include a transaction identifier that uniquely identifies the particular writeback operation that is associated with the writeback data. Additionally, the state information may include information about the overall completion status of the writeback operation, such as a status bit indicating whether a particular writeback transaction identifier has received a final writeback acknowledgement from lower-level memory 520. Thus, in some embodiments, the overall completion status of a writeback operation may be indicated separately from whether the writeback operation currently occupies an entry of writeback buffer 510.

The writeback data is then sent from the writeback buffer to lower-level memory to be written back, and the state information is updated to indicate that the corresponding entry of the writeback buffer is now free to accept new data (block 904). For example, lower-level memory 520 may indicate to writeback cache 500 that it is ready to accept a new writeback operation, and writeback cache 500 may correspondingly cause writeback buffer 510 to transmit writeback data to lower-level memory 520. In some embodiments, a corresponding transaction identifier may accompany the writeback data. Writeback cache 500 may also modify state information to indicate that the writeback buffer entry that stored the writeback data just sent to lower-level memory is now free (e.g., by clearing a status bit associated with the writeback buffer entry). It is noted that at this point, a different writeback operation may store data into the freed writeback buffer entry.

The writeback cache may receive acknowledgment of completion of the writeback operation from the lower-level memory (block 906). For example, lower-level memory 520 may be configured to send a status indication along with a transaction identifier to writeback cache 500 indicating that the identified writeback operation has been committed to memory. In response, the writeback cache may update state information to indicate that the identified writeback operation has been completed and need no longer be tracked (block 908).

Figure 10:
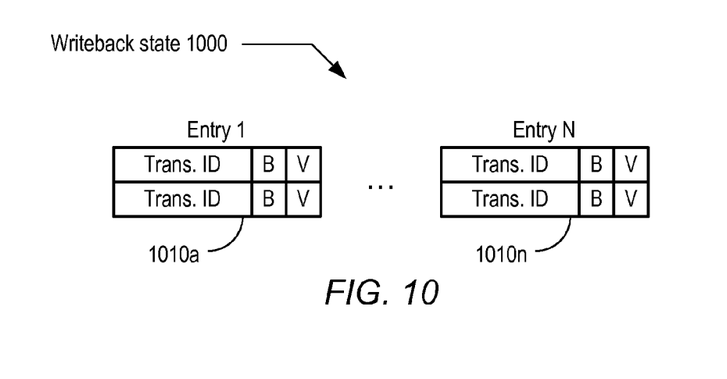
FIG. 10 is a block diagram illustrating an example organization of writeback state information.

FIG. 10 illustrates a simple example of how state information associated with writeback operations may be organized. In the illustrated embodiment, writeback state 1000 includes multiple state structures 1010*a-n* (which may be implemented using registers, discrete logic, or any suitable technology), each one corresponding to a respective physical entry of writeback buffer 510. Each structure 1010 may be configured to store a pair of transaction identifiers. Each transaction identifier has a status bit V indicating whether the corresponding transaction identifier is valid. For example, the V bit may indicate that the transaction identifier corresponds to a writeback operation that has not yet been acknowledged as complete by lower-level memory 520. Each transaction identifier also has a status bit B indicating whether writeback data corresponding to the transaction identifier currently occupies writeback buffer 500.

In one possible mode of operation, the B and V bits may be initially cleared at system reset. When an eviction occurs and writeback data is written to an entry of writeback buffer 510 (e.g., entry 1), the transaction identifier corresponding to this writeback operation may be stored within state structure 1010*a*, and its corresponding B and V bits may be set to indicate that the writeback operation is valid and its data currently occupies entry 1 of writeback buffer 510. When the writeback data is later sent to lower-level memory 520, the B bit may be cleared to indicate that while the writeback operation is still outstanding (i.e., the V bit remains set), its data no longer occupies writeback buffer 510. In this state (i.e., bits BV=01), another writeback operation may be allowed to write its transaction identifier into the unused portion of state structure 1010a, and to write its data into entry 1 of writeback buffer 510. When the first writeback operation is acknowledged as complete, its V bit may be cleared, freeing that portion of state structure 1010a for use by a new writeback operation.

It is noted that the embodiment of FIG. 10 represents only a simple example intended to facilitate understanding of the possible operation of a writeback cache. Numerous variations and alternatives are possible and contemplated.

Example System Embodiment

Figure 11:
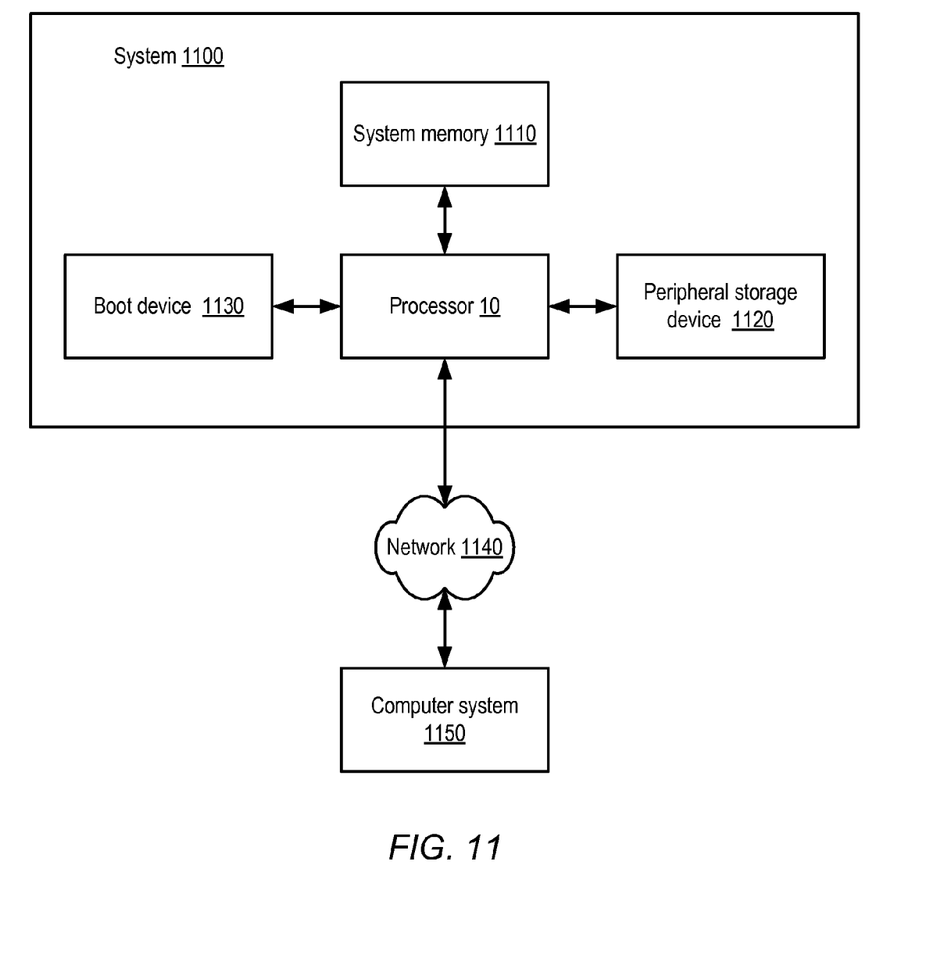
FIG. 11 is a block diagram illustrating an embodiment of a system including a multithreaded processor.

As described above, in some embodiments processor 10 as shown in FIG. 3 or 4 may be configured to interface with a number of external devices. An embodiment of a system including processor 10 is illustrated in FIG. 11. In the illustrated embodiment, system 1100 includes an instance of processor 10 coupled to a system memory 1110, a peripheral storage device 1120 and a boot device 1130. System 1100 is coupled to a network 1140, which is in turn coupled to another computer system 1150. In some embodiments, system 1100 may include more than one instance of the devices shown, such as more than one processor 10, for example. In various embodiments, system 1100 may be configured as a rack-mountable server system, a standalone system, or in any other suitable form factor. In some embodiments, system 1100 may be configured as a client system rather than a server system.

In various embodiments, system memory 1110 may comprise any suitable type of system memory as described above, such as FB-DIMM, DDR/DDR2 SDRAM, or RDRAM®, for example. System memory 1110 may include multiple discrete banks of memory controlled by discrete memory interfaces in embodiments of processor 10 configured to provide multiple memory interfaces 130. Also, in some embodiments system memory 1110 may include multiple different types of memory.

Peripheral storage device 1120, in various embodiments, may include support for magnetic, optical, or solid-state storage media such as hard drives, optical disks, nonvolatile RAM devices, etc. In some embodiments, peripheral storage device 1120 may include more complex storage devices such as disk arrays or storage area networks (SANs), which may be coupled to processor 10 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 10, such as multimedia devices, graphics/display devices, standard input/output devices, etc.

As described previously, in one embodiment boot device 1130 may include a device such as an FPGA or ASIC configured to coordinate initialization and boot of processor 10, such as from a power-on reset state. Additionally, in some embodiments boot device 1130 may include a secondary computer system configured to allow access to administrative functions such as debug or test modes of processor 10.

Network 1140 may include any suitable devices, media and/or protocol for interconnecting computer systems, such as wired or wireless Ethernet, for example. In various embodiments, network 1140 may include local area networks (LANs), wide area networks (WANs), telecommunication networks, or other suitable types of networks. In some embodiments, computer system 1150 may be similar to or identical in configuration to illustrated system 1100, whereas in other embodiments, computer system 1150 may be substantially differently configured. For example, computer system 1150 may be a server system, a processor-based client system, a stateless "thin" client system, a mobile device, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processor, comprising:
a hardware writeback cache configured to store data retrieved from a lower-level memory and further configured to perform a first writeback operation to store corresponding writeback data back to the lower-level memory upon eviction of the writeback data from the writeback cache; and
a hardware writeback buffer configured to store the writeback data after the writeback data has been evicted from the writeback cache and before the writeback data has been sent to the lower-level memory;
wherein after the writeback data has been sent from the writeback buffer to the lower-level memory and before the lower-level memory has acknowledged completion of the first writeback operation, the writeback cache is further configured to perform a second writeback operation to store different writeback data, corresponding to the second writeback operation, in the writeback buffer in response to eviction of the different writeback data from the writeback cache, such that for at least some set of concurrently at least some set of outstanding write back operations, a total size of writeback data for the concurrently outstanding writeback operations exceeds a total size of writeback data that the writeback buffer is capable of concurrently storing.

2. The processor as recited in claim 1, wherein after the lower-level memory has acknowledged completion of the first writeback operation, after the different writeback data has been sent from the writeback buffer to the lower-level memory, and before the lower-level memory has acknowledged completion of the second writeback operation, the writeback cache is further configured to perform a third writeback operation to store third writeback data, corresponding to the third writeback operation, in the writeback buffer in response to eviction of the third writeback data from the writeback cache.

3. The processor as recited in claim 2, wherein the writeback cache is configured as a set-associative cache comprising a plurality of ways, and wherein the first, second, and third writeback operations correspond to evictions from a same set of the writeback cache.

4. The processor as recited in claim 1, wherein the lower-level memory comprises a cache memory configured as a direct-mapped or a set-associative cache.

5. The processor as recited in claim 1, wherein the lower-level memory comprises a system memory including dynamic random-access memory.

6. The processor as recited in claim 1, wherein the writeback buffer comprises a plurality of entries each configured to store writeback data corresponding to a respective writeback operation.

7. The processor as recited in claim 1, further comprising a plurality of processor cores each configured to execute instructions and to generate accesses to the writeback cache.

8. A method, comprising:
performing a first writeback operation to store corresponding writeback data back to a lower-level memory upon eviction of the writeback data from a writeback cache;
a hardware writeback buffer receiving the writeback data from the writeback cache after the writeback data has been evicted and storing the writeback data until the writeback data is sent to the lower-level memory;
after the writeback data has been sent from the writeback buffer to the lower-level memory and before the lower-level memory has acknowledged completion of the first writeback operation, performing a second writeback operation to store different writeback data, corresponding to the second writeback operation, in the writeback buffer in response to eviction of the different writeback data from the writeback cache, such that for at least some set of concurrently outstanding write back operations, a total size of writeback data for the concurrently at least some set of outstanding writeback operations exceeds a total size of writeback data that the writeback buffer is capable of concurrently storing.

9. The method as recited in claim 8, further comprising:
after the lower-level memory has acknowledged completion of the first writeback operation, after the different writeback data has been sent from the writeback buffer to the lower-level memory, and before the lower-level memory has acknowledged completion of the second writeback operation, the writeback cache performing a third writeback operation to store third writeback data, corresponding to the third writeback operation, in the writeback buffer in response to eviction of the third writeback data from the writeback cache.

10. The method as recited in claim 9, wherein the writeback cache is configured as a set-associative cache comprising a plurality of ways, and wherein the first, second, and third writeback operations correspond to evictions from a same set of the writeback cache.

11. The method as recited in claim 8, wherein the lower-level memory comprises a cache memory configured as a direct-mapped or a set-associative cache.

12. The method as recited in claim 8, wherein the lower-level memory comprises a system memory including dynamic random-access memory.

13. The method as recited in claim 8, wherein the writeback buffer comprises a plurality of entries each configured to store writeback data corresponding to a respective writeback operation.

14. The method as recited in claim 8, further comprising a plurality of processor cores each configured to execute instructions and to generate accesses to the writeback cache.

15. A system, comprising:
a system memory; and
a processor coupled to the system memory, wherein the processor comprises:
a hardware writeback cache configured to store data retrieved from a lower-level memory and further configured to perform a first writeback operation to store corresponding writeback data back to the lower-level memory upon eviction of the writeback data from the writeback cache; and
a hardware writeback buffer configured to store the writeback data after the writeback data has been evicted from the writeback cache and before the writeback data has been sent to the lower-level memory;
wherein after the writeback data has been sent from the writeback buffer to the lower-level memory and before the lower-level memory has acknowledged completion of the first writeback operation, the writeback cache is further configured to perform a second writeback operation to store different writeback data, corresponding to the second writeback operation, in the writeback buffer in response to eviction of the different writeback data from the writeback cache, such that for at least some set of concurrently at least some set of outstanding write back operations, a total size of writeback data for the concurrently outstanding writeback operations exceeds a total size of writeback data that the writeback buffer is capable of concurrently storing.

16. The system as recited in claim 15, wherein after the lower-level memory has acknowledged completion of the first writeback operation, after the different writeback data has been sent from the writeback buffer to the lower-level memory, and before the lower-level memory has acknowledged completion of the second writeback operation, the writeback cache is further configured to perform a third writeback operation to store third writeback data, corresponding to the third writeback operation, in the writeback buffer in response to eviction of the third writeback data from the writeback cache.

17. The system as recited in claim 16, wherein the writeback cache is configured as a set-associative cache comprising a plurality of ways, and wherein the first, second, and third writeback operations correspond to evictions from a same set of the writeback cache.

18. The system as recited in claim 15, wherein the lower-level memory comprises a cache memory configured as a direct-mapped or a set-associative cache.

19. The system as recited in claim 15, wherein the lower-level memory comprises the system memory.

20. The system as recited in claim 15, wherein the writeback buffer comprises a plurality of entries each configured to store writeback data corresponding to a respective writeback operation.

* * * * *